United States Patent
Owen et al.

(10) Patent No.: US 7,230,730 B2
(45) Date of Patent: Jun. 12, 2007

(54) SELECTIVE PRINTING AFTER CONSUMABLE EXHAUSTION

(75) Inventors: Kevin Owen, Meridian, ID (US); Jeetendra Kumar, Boise, ID (US); Travis Moats, Nampa, ID (US); Mark A. Harper, Middleton, ID (US); Sandra L. Schneider, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 889 days.

(21) Appl. No.: 10/282,894

(22) Filed: Oct. 29, 2002

(65) Prior Publication Data

US 2004/0080783 A1 Apr. 29, 2004

(51) Int. Cl.
*G06F 15/00* (2006.01)
*G03G 15/08* (2006.01)

(52) U.S. Cl. .................. 358/1.14; 358/1.14; 399/27
(58) Field of Classification Search .............. 358/1.14, 358/1.15, 1.16, 1.9; 399/27, 28, 45, 9, 82; 347/14, 85; 709/226, 132; 600/300, 432
See application file for complete search history.

(56) References Cited

U.S. PATENT DOCUMENTS

2003/0090696 A1* 5/2003 Willis et al. ............... 358/1.14

* cited by examiner

*Primary Examiner*—King Y. Poon
*Assistant Examiner*—Saeid Ebrahimi

(57) ABSTRACT

A printing device has a replaceable component. Printing by the printing device utilizes the replaceable component. Printing with the printing device is stopped when an end-of-life condition is detected for the replaceable component. A list of one or more identifiers (IDs) is output for pending print jobs. In response to an input of one of the IDs, the corresponding pending print job is printed.

9 Claims, 7 Drawing Sheets

SELECTIVE PRINTING AFTER CONSUMABLE EXHAUSTION

FIELD OF THE INVENTION

The present invention relates to printing that uses a consumable. More particularly, the invention relates to selectively printing after a consumable has been estimated to have been exhausted.

BACKGROUND OF THE INVENTION

Most types of printing devices are equipped with items that are used up and/or have a life cycle during printing operations. These items can include one or more printing supplies, a printing media available to be printed on during the printing, a printing substance available for application to the printing media during the printing, toner available for application to the printing media during the printing, a laser printer drum, laser printer developer, a laser printer fuser, a printing media transfer belt, staples for stapling the printing media during the printing, a storage volume that is available to store paper that has been printed on by the printing device, and the like. These items are referred to herein as replaceable components. When a replaceable component is exhausted or at the end of its life cycle, the replaceable component must be replaced for the printing device to continue to function properly. For example, a replaceable component can be removed and another installed in a printer to provide a printing supply for the printing process.

Replaceable components can be manufactured with memory which can be placed on the component itself or within a label affixed to the component. This memory is typically used to store printer-related data that the printer reads to determine various printing parameters. For example, the memory may store the model number of the component so that the printer may recognize the cartridge as valid or invalid for use with that printer.

As documents are printed, the replaceable component is gradually depleted. The printer communicates with the memory of the replaceable component to detect, estimate, determine, and/or derive when a state of exhaustion has been reached. Once the replaceable component is deemed to have been exhausted, the printer will stop printing. The printer is also configured to resume printing when the replaceable component is replaced.

In making a judgment as to the exhaustion of a replaceable component, a safety margin is generally included that accounts for variables such as temperature, humidity, sensor inaccuracy, etc. The safety margin effectively decreases the likelihood of printing any portion of the complete printout with poor print quality. As such, the replaceable component may be sufficient to print some, and perhaps the entire print job with good or near-good print quality. For instance, if a printer is printing a one hundred (100) page print job and the toner in the toner cartridge is sensed as reaching its safety margin for a state of out toner at the ninetieth (90th) page, the remaining ten (10) pages will not be printed. If the remaining ten (10) pages could be printed by the printer, they would likely still be readable, possibly with lighter printed characters due to the low toner condition.

Once the printing device determines that the margin of safety for the replaceable component has been exceeded so as to establish an end-of-life condition, the printing stops. The cessation from printing can occur at any point in a print job that a user has requested and has been waiting for. If a user cannot locate or is otherwise unable to obtain or install the needed replaceable component, the user will not be able to obtain the desired complete printout. Frustration can arise for the user where only a draft copy of the complete print job is needed and the user is not particularly concerned with the resultant print quality. Consequently, there is a need for improved methods and printing devices that can provide the user with the desired complete printout after a replaceable component is estimated to have been exhausted.

SUMMARY OF THE INVENTION

The above-stated needs and/or others are met, for example, by a printing device that has a replaceable component that is used to print. Printing is stopped in response to an end-of-life condition of the replaceable component. A diagnostic reflecting the end-of-life condition and a list of identifiers of one or more pending print jobs are output. One of the pending print jobs is printed in response to an input of its ID.

DESCRIPTION OF THE DRAWINGS

The present invention is illustrated by way of example and not limitation in the figures of the accompanying drawings. The drawings are implementations of the invention to which the invention is not limited. The same numbers are used throughout the figures to reference like components and/or features.

DETAILED DESCRIPTION

Figure 1:
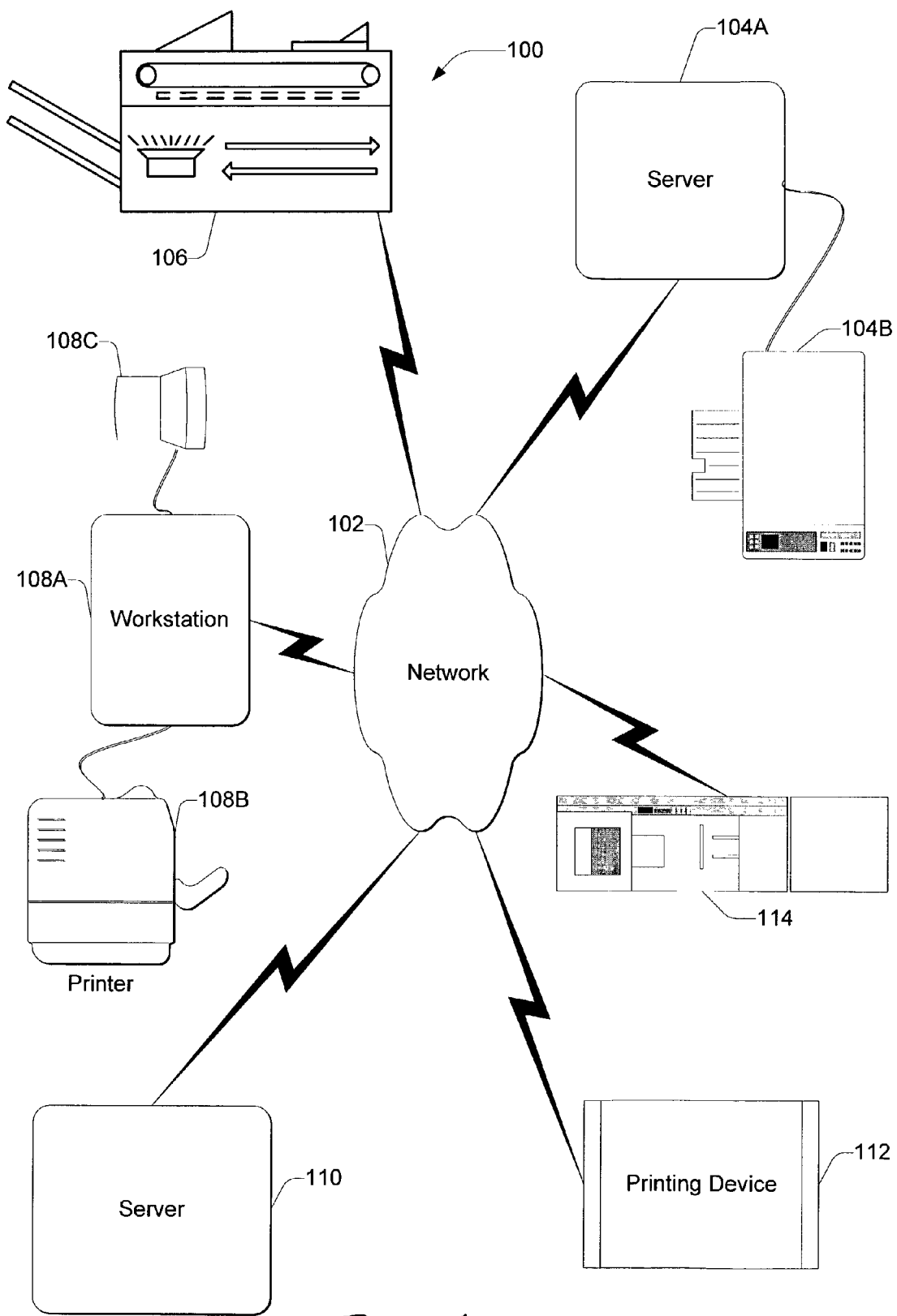
FIG. 1 illustrates a network environment in which multiple servers, one or more workstations, and printers are coupled to one another via an interconnected network.

Methods and printing devices, according to various implementations, relate to a client device or document processing device such as personal computer (PC) that executes a document processing application, such as a word processor application, that creates and/or stores a document that is to be output at a printer. The document processing application typically has a printer driver application that can be used to create print data from a document that has been stored and/or created. In order to print out the document, the document processing application receives a request for a printing function to obtain a print out on a printer specified in the requested printing function. The printing function sends print data to the requested printer and the printing of a corresponding print job begins. If at any point during the printing of the print job it is estimated that there are insufficient printing supplies to print the remainder of the print job, the printer will stop printing and a diagnostic will be output that references the estimated insufficiency. A list of identifiers (ID) corresponding to all pending print jobs in a print queue will also be output, along with a prompt that requests a user to input an ID of a print job in the print queue that the user wishes to have printed, despite the estimated insufficiency. The input of the ID in response to the prompt will cause the printer to print the print job corresponding to the ID. The user can also input a number of pages in the print job that are to be printed. As such, the printing of the print job will be performed for the remainder, or a specified portion of, the user-specified print job. As such, the response to the prompt is honored and the user that is responsible for the input of the print job ID will have assumed the risk of the possibility of decreased quality in the specified print job.

In an alternative implementation described herein, the printing device has a replaceable component. The replaceable component, which has a useable life, gets used up as the printing device prints. The printing at the printing device stops in response to an estimated end-of-life condition of the replaceable component. The end-of-life condition signifies a potential quality degradation of the printed result if the printing is resumed. A diagnostic is output that reflects the end-of-life condition as well as a list of ID in a pending print queue. Printing of the print job in the print queue corresponding to an ID will begin in response an input of the ID.

The printing device can include a memory for storing replaceable component usage data used in estimating the end-of-life condition of the replaceable component. The replaceable component usage data in the memory is updated during the printing. The memory can, but need not be, integral with the replaceable component. Examples of integral memory are a radio frequency identification (RFID) memory and a direct contact identification memory.

The potential quality degradation of the printing can vary depending, for example, upon the type of printing device to which a print job is directed and the type of replaceable component being used by the printing device. The quality of the print job, if resumed after stopping the printing, may not immediately decrease because a margin of safety can be built into the end-of-life condition against which the replaceable component is measured. The end-of-life condition can be an insufficiency of printing supplies in the replaceable component. By way of example, and not by way of limitation, this insufficiency can be the printing media available to be printed on during the printing, the printing substance (e.g. printing ink) available for application to the printing media during the printing, the toner available for application to the printing media during the printing, an exhaustible aspect of a laser printer drum, developer, or fuser that can be used while printing on a laser printer, an exhaustible aspect of a printing media transfer belt, staples that are available for stapling the printing media during the printing, or storage available for storing the printing media after it has been printed by the printing device.

In various implementations, the printing device and/or the replaceable component can have one or more sensors. Each sensor can sense an aspect of the replaceable component related to the exhaustion thereof. The printing is stopped in response to an end-of-life condition of the replaceable component that is derived by comparing the aspect sensed by a sensor to a corresponding predetermined quantity. This comparison of the sensed condition can be with any of the foregoing list of replaceable components to identify potential insufficiencies to complete the remainder of a print job.

The printing device has an input mechanism to receive a demand for resuming the printing operation. The input mechanism can be a button or a toggle switch on the printing device that can be depressed of otherwise activated by a user. The input mechanism can also be an input device in communication with a computing device that is in communication with the printing device, such as a keyboard or a computer mouse.

An output mechanism can be associated with the printing device upon which the diagnostic can be displayed. The output mechanism can be a display screen on the printer or a display screen in communication with a computing device that is in communication with the printing device. The diagnostic can be printed on a hardcopy printout that is printed by the printing device.

The memory can be used to store replaceable component usage data during the printing operations after the replaceable component is installed in the printing device. The replaceable component usage data can be used to estimate when the replaceable component is at an end-of-life condition. The estimating can be made by comparing the replaceable component usage data in the memory to a corresponding predetermined quantity. The replaceable component usage data can be stored in the memory periodically during the printing operations and/or at predetermined intervals.

By way of example, and not by way of limitation, a laser printer can have a toner cartridge that is installable in and removable from the laser printer. The toner cartridge can have a memory that is configured to store replaceable component usage data received from a reader/writer located in the laser printer. The reader/writer monitors replaceable component usage data. The reader/writer can compare a predetermined quantity to the replaceable component usage data to estimate that the toner cartridge is exhausted or is likely to be near exhaustion. The memory, which can be an RFID memory or a direct contact identification memory, can also store an out-of-toner status received from the reader/writer after the reader/writer estimates, based on the monitoring, that the toner in the toner cartridge is near exhaustion. A sensor can also be used to monitor the available quantity of toner in the toner cartridge. The reader/writer can receive the available quantity of toner in the toner cartridge from the sensor which can in turn be used to estimate that the toner in the toner cartridge is near exhaustion. The sensor may also be configured to detect and transmit a "toner out" level, after which printing is disabled. Alternatively, the replaceable component usage data can be a page count received from a page counter in the reader/writer that maintains a page count that is the number of pages printed using the toner cartridge. Once this page count is compared to a predetermined maximum page count, the toner cartridge can be estimated to be near exhaustion.

FIG. 1 illustrates a network environment 100 in which a plurality of network resources are communication via an interconnected network 102. As such, multiple servers 104A, 110, a workstation 108A, and printing devices 104B, 106, 108B, 112, 114 are coupled to one another via interconnected network 102. Interconnected network 102 couples together servers 104A and 110, computer workstation 108A, printing devices 104B, 106, 108B, 112, and 114, and a computer monitor 108C. Printing devices 104B, 108B and computer monitor 108C are coupled to interconnected network 102 through their respective local connections to server 104A and workstation 108A. Interconnected network 102 can be any type of network, such as a local area network (LAN) or a wide area network (WAN), using any type of network topology and any network communication protocol. In a particular embodiment, interconnected network 102 can be the Internet. Although only a few devices are shown coupled to interconnected network 102, a typical network may include tens or hundreds of devices coupled to one another. Furthermore, interconnected network 102 may be coupled to one or more other networks, thereby providing coupling between numerous devices. A user can schedule a print job at any server 104A, 110 or workstation 108A to be printed at any printing device 104B, 106, 108B, 112, 114.

Servers 104A and 110 may be file servers, e-mail servers, database servers, print servers, or any other type of network server. Workstation 108A can be any type of computing device, such as a mobile computing device, including a personal computer, a laptop computer, and a personal digital assistant (PDA). Although not shown in FIG. 1, one or more workstations and/or servers may contain a print rendering engine capable of converting raw print job data into a particular format (e.g., language) understood by certain types of printers.

Particular implementations illustrate an ink jet printer 104B and laser printers 106, 108B. Alternate implementations, however, are implemented with other printers such as with printing device 112 that is illustrated as being in communication with interconnected network 102 independent of a server or workstation. Printing device 112 is intended to represent a printer to which output can be directed from a computing device, including but not limited to, laser printers, ink-jet printers, bubble-jet printers, copiers, fax machines, and the like. Additionally, printing device 112 can be any type of device that can output a print job by hardcopy such as on paper, and any other type of printer including those referred to above. A digital press or network copier 114 is seen in FIG. 1 as a printing device to which output can be direct according to at least one implementation.

Figure 2:
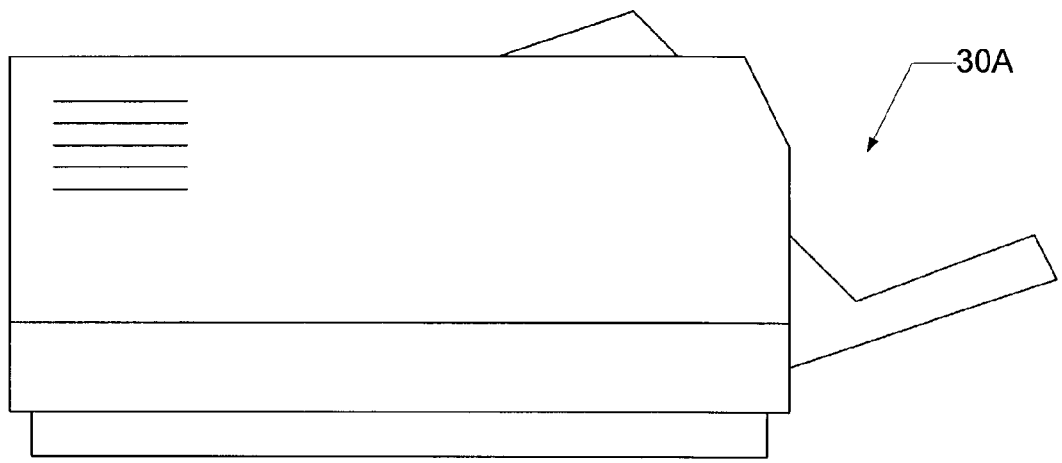
FIG. 2 is a diagrammatic illustration of a laser printer.
Figure 3:
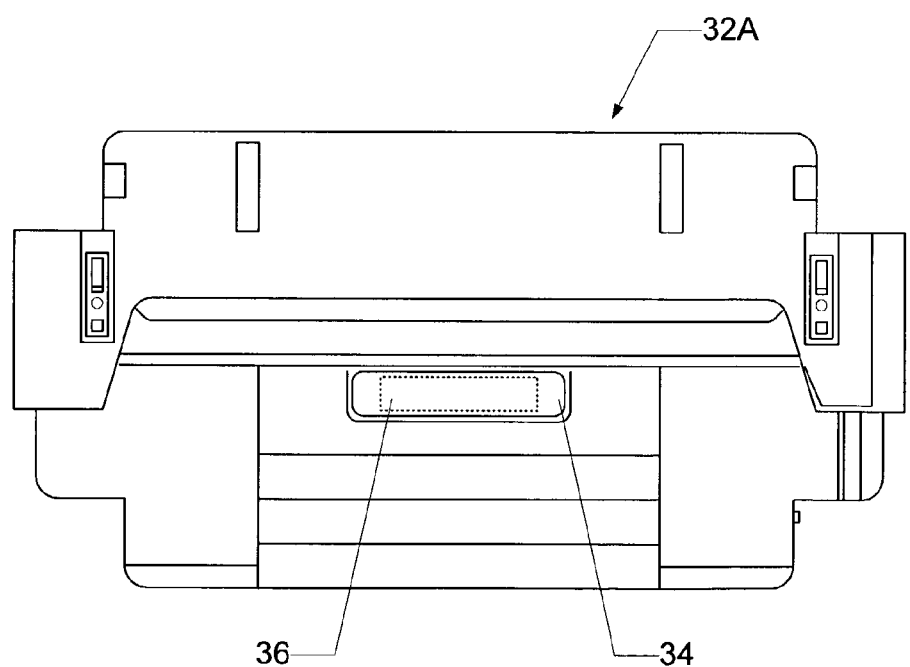
FIG. 3 is a diagrammatic illustration of a laser printer toner cartridge in a laser printer.

FIG. 2 is a diagrammatic illustration of a laser printer 30A in an implementation. FIG. 3 shows a toner cartridge 32A that is installable in the laser printer 30A. The toner cartridge 32A has a label 34 that contains information identifying the toner cartridge 32A to a user. The label 34 typically recites the name of the manufacturer, the model number of the cartridge, etc. Although various implementations are shown and described herein with respect to a printer toner cartridge for a laser printer, it is noted that other implementations may be embodied as any replaceable component (toner cartridge, ink cartridge, fuser, drum, etc.) installable in a printing device (printer, copier, fax machine, etc.).

A memory tag 36 can be located underneath the human-readable label 34 on the toner cartridge 32A, although the memory tag 36 may be placed on the toner cartridge 32A at any location which may be practical for the purposes described herein. The memory tag 36, which can be a conventional semiconductor memory, can communicate with laser printer 30A by a direct electrical connection thereto, and would be, as such, a direct connection memory tag. Alternatively, memory tag 36 can be a radio frequency identification (RFID) memory tag. RFID memory tags and applications therefore are well known in the art.

Figure 4:
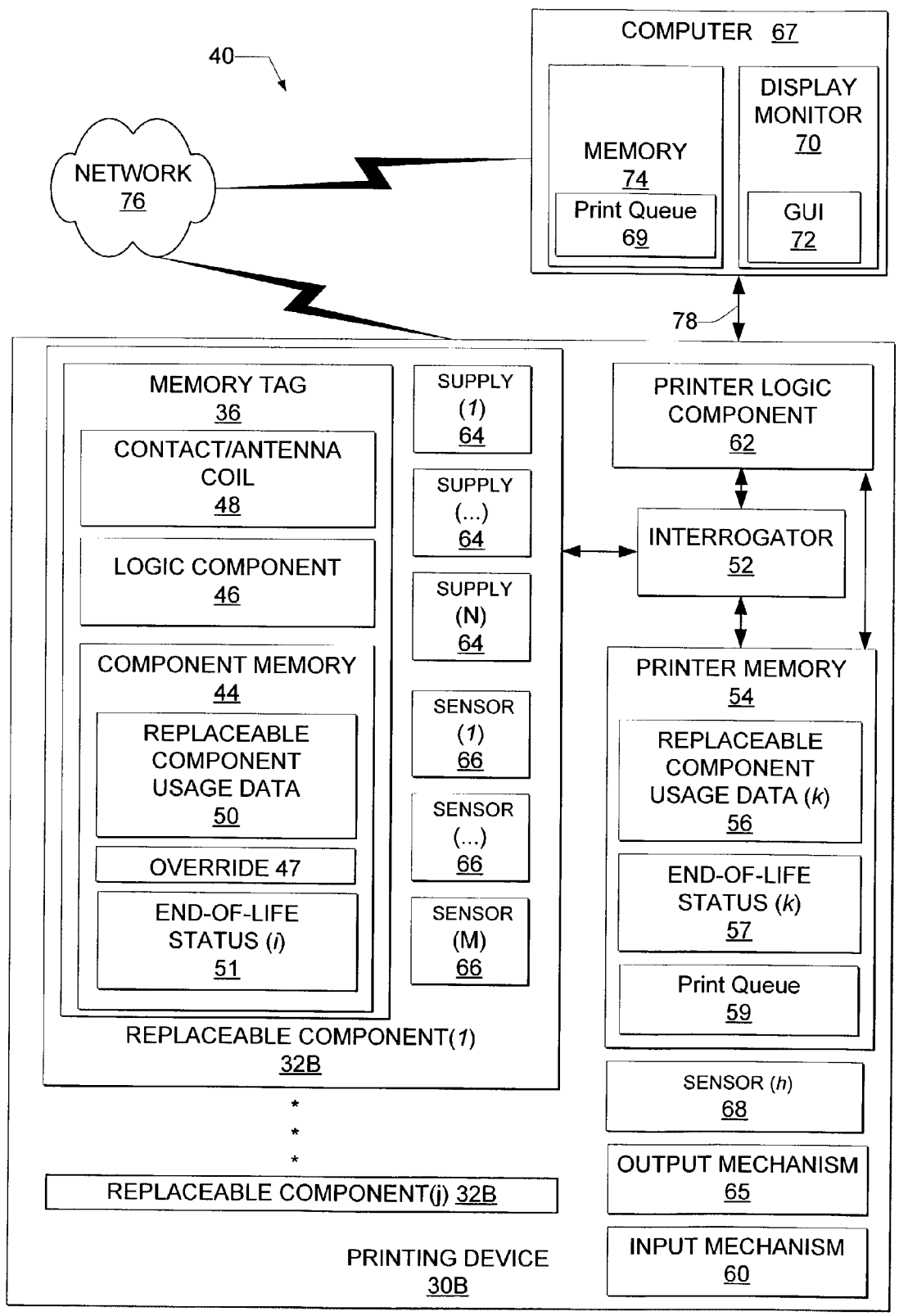
FIG. 4 is a block diagram of a printing system.

FIG. 4 is a block diagram of printing system 40 that includes a printing device 30B. Printing device 30B has at least one replaceable component 32B. As seen in FIG. 4, printing device 30B can have replaceable component (1) 32B through replaceable component (j) 32B. Each replaceable component 32B is installed in printing device 30B and may be removed and replaced by a like replaceable component (not shown). Each replaceable component 32B can include a memory tag 36 and at least one supply 64. As seen in FIG. 4, each replaceable component 32B can have supply (1) 64 through supply (N) 64. When printing device 30B prints, the at least one supply 64 is used. Use of the at least one supply 64 by printing device 30B in printing a print job can result in the exhaustion of the at least one supply 64. At least one sensor 66 can be used to sense the quality and/or quality of the at least one supply 64. As seen in FIG. 4, sensor (1) 66 through sensor (M) 66 can be used to respectively sense the quality and/or quality of supply (1) 64 through supply (N) 64. The number of supplies 64 need not be the same as the number of sensors 66. By way of example, and not by way of limitation, each supply 64 can be a printing supply, a printing media available to be printed on during the printing, a printing substance available for application to the printing media during the printing, toner available for application to the printing media during the printing, a laser printer drum, laser printer developer, a laser printer fuser, a printing media transfer belt, staples for stapling the printing media during the printing, a storage volume that is available to store paper that has been printed on by the printing device, etc.

Memory tag 36 has a component memory 44, a logic component 46, and an electrical contact or antenna coil 48. The component memory 44 has at least one storage area that can include a replaceable component usage data 50 and an end-of-life status (i) 51. End-of-life status (i) 51 can be used to respectively store an estimated state of the end-of-life for the at least one supply 64. Memory tag 36 operates in conjunction with an interrogating device, also known as an interrogator. An interrogator is a device that provides power to, reads from and/or writes to, the memory tag 36. Examples of interrogators include a memory tag reader or scanner, a memory tag writing device which stores data on the memory tag 36, and the like. In the present example, the printing device 30B includes an interrogator 52. Interrogator 52 performs functions of a reader/writer, such as monitoring replaceable component usage data 50.

The interrogator 52 can be electrically connected to contact 48 or the interrogator 52 can emits a radio frequency field that provides power to the memory tag 36 via the antenna coil 48. The memory tag 36, therefore, does not require its own power supply. Communications between the interrogator 52 via antenna coil 48 and the memory tag 36 are transmitted and received via the radio frequency field and the antenna coil 48 utilizing standard RFID method and protocol, such as promulgated in ISO 14443 and ISO 15693. Therefore, physical contact between the memory tag 36 and the printer 30 is not required for the printer 30 to communicate with the memory tag 36 as an RFID memory.

Each replaceable component 32B communicates with printing device 30B, which includes a printer memory 54. The printer memory 54 contains a print queue 59 and one or more storage areas that can include, but are not limited to, replaceable component usage data (k) 56 and end-of-life status (k) 57. Replaceable component usage data (k) 56 and end-of-life status (k) 57 store data that respectively correspond to replaceable component (1) 32B through replaceable component (j) 32B. Print queue 50 contains print data for each of one or more print jobs. Each print job is identified by a print job identifier (ID). Alternatively, or in addition thereto, a print queue can also be stored in a memory 74 of a computer 67 that is in communication with printing device 30B. The contents of print queues 59, 69 are discussed more particularly with respect to FIG. 5.

The printing device 30B has an input mechanism 60 that can be a toggle switch or a button that can be depressed or otherwise activated by a user. A printer logic component 62 is included in printing device 30B to execute instructions for a printing operation. An output mechanism 65 can be a printing mechanism to print a print substance on print media (e.g. selectively placing printing ink on paper). Output mechanism 65 can also include a display device for displaying a diagnostic and/or a prompt.

One or more of sensor(s) 66 and sensor(s) 68 can be used to sense the respective quantity and/or quality of one or more of supply (1) 64 through supply (N) 64 of one or more of respective replaceable component (1) 32B through replaceable component (j) 32B. As such, each sensor 66 and/or sensor 68 can be configured to detect the occurrence of an end-of-life condition, for example, a low toner condition in a toner cartridge, a low number of pages remaining in a page supply for printing device 30B, a predetermined number of pages that have been printed after a particular replaceable component 32B was installed in printing device 30B, a predetermined passage of time after a particular replaceable component 32B was installed in printing device 30B, etc. A non-sensor life calculation can also be made for a fuser, a transfer belt, etc.

Printing device 30B is connected to computer 67, which can be any of servers 104A, 110 or workstation 108A seen in FIG. 1. Computer 67 includes memory 74 and a display monitor 70. Display monitor 70 is an example of monitor 108C seen in FIG. 1. A graphical user interface (GUI) 72 is displayed on the display monitor 70 to provide visual information to the user. A user can use computer 67 to schedule a print out on printing device 30B. A diagnostic with respect to an end-of-life condition of any replaceable component 32B can be displayed upon display monitor 70. The diagnostic can be a characterization of the end-of-life condition. The display also includes the IDs of print jobs pending in a print queue. The prompt can be instructions to a user on how to input a demand to printing device 30B to print a print job that is pending in the print queue. The prompt can also be instructions to a user to enter a number of pages of the remainder of the current print job that the user wishes to have printed.

The computer 67 and printing device 30B are connected via a network 76, such as the Internet, a local area network (LAN), a wide area network (WAN), or the like. Alternatively, computer 67 and printing device 30B can also be connected via a direct connection 78, such as by a parallel, serial, or USB port or other conventional connection scheme.

Figure 5:
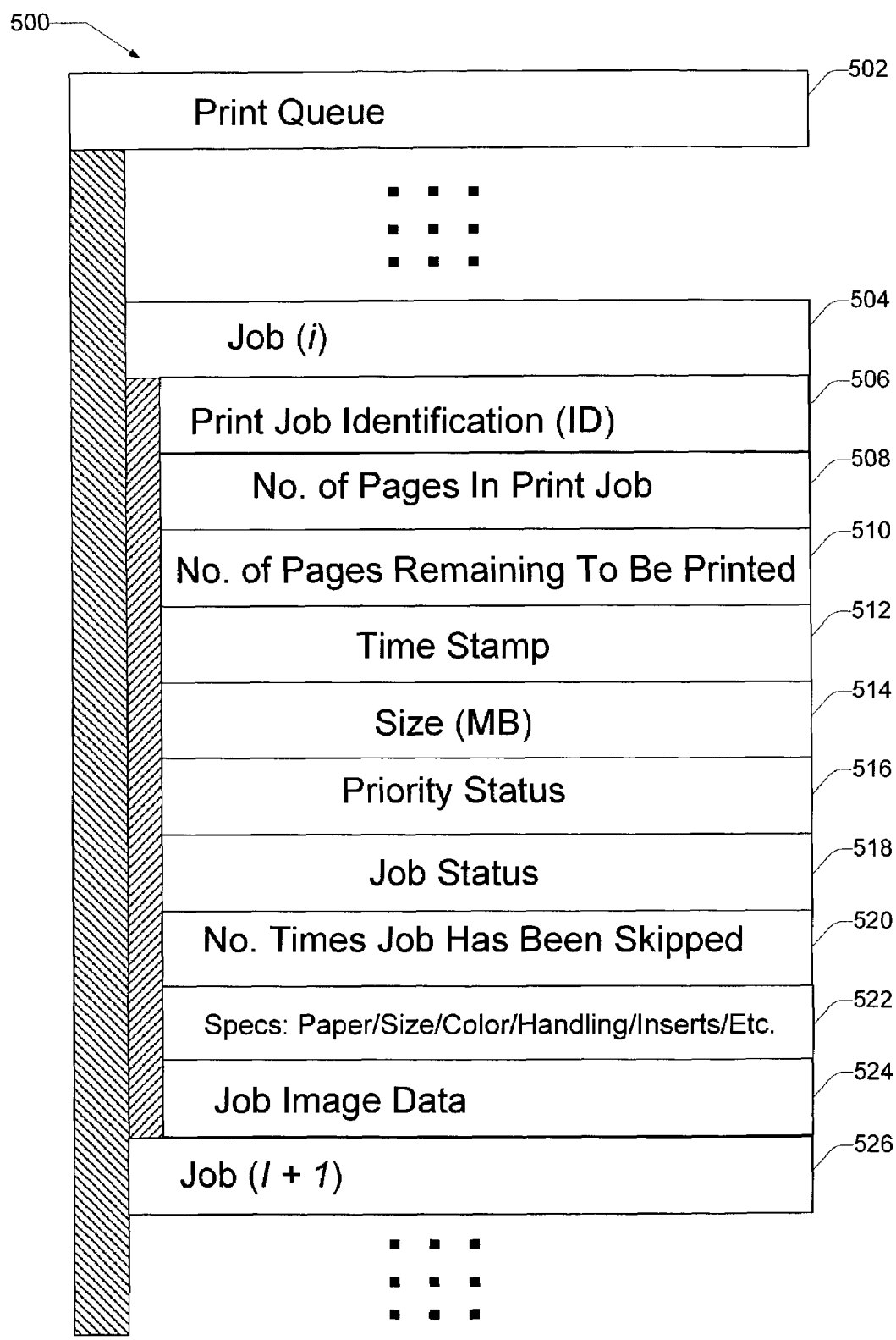
FIG. 5 is a block diagram of a print queue data structure.

FIG. 5 provides for exemplary purposes what may be used as a print queue 502 that is stored in printing device 30A and/or computer 67. One or more jobs 504 are stored in print queue 502 (e.g. Job (1), *, Job (i), Job (i+1), *). Each job 504 includes a plurality of data. These data can include a print job identification (ID) 506, the number of pages in the print job 508, the number of pages that have not yet been printed in the print job 508, a time stamp 512 for when the print job 504 was placed into print queue 502, the size 514 of the job image data 524 in the print job 504, a priority status 516 such as urgent/high/medium/low/etc., a job status 518 such as hold/delay 24 Hrs./Wait of specific event/etc., the number of times 520 that the print job 504 has been skipped from being printed by printing device 30A, the specification of how print job 504 is to be printed including paper type/paper size/color/grey scale/black-white/inserts to be inserted in the print job/binding/collating/folding/stacking/stapling/type of stitching/edge-trimming/etc., and the job image data 524 that is to be printed out by printing device 30B.

Figure 6:
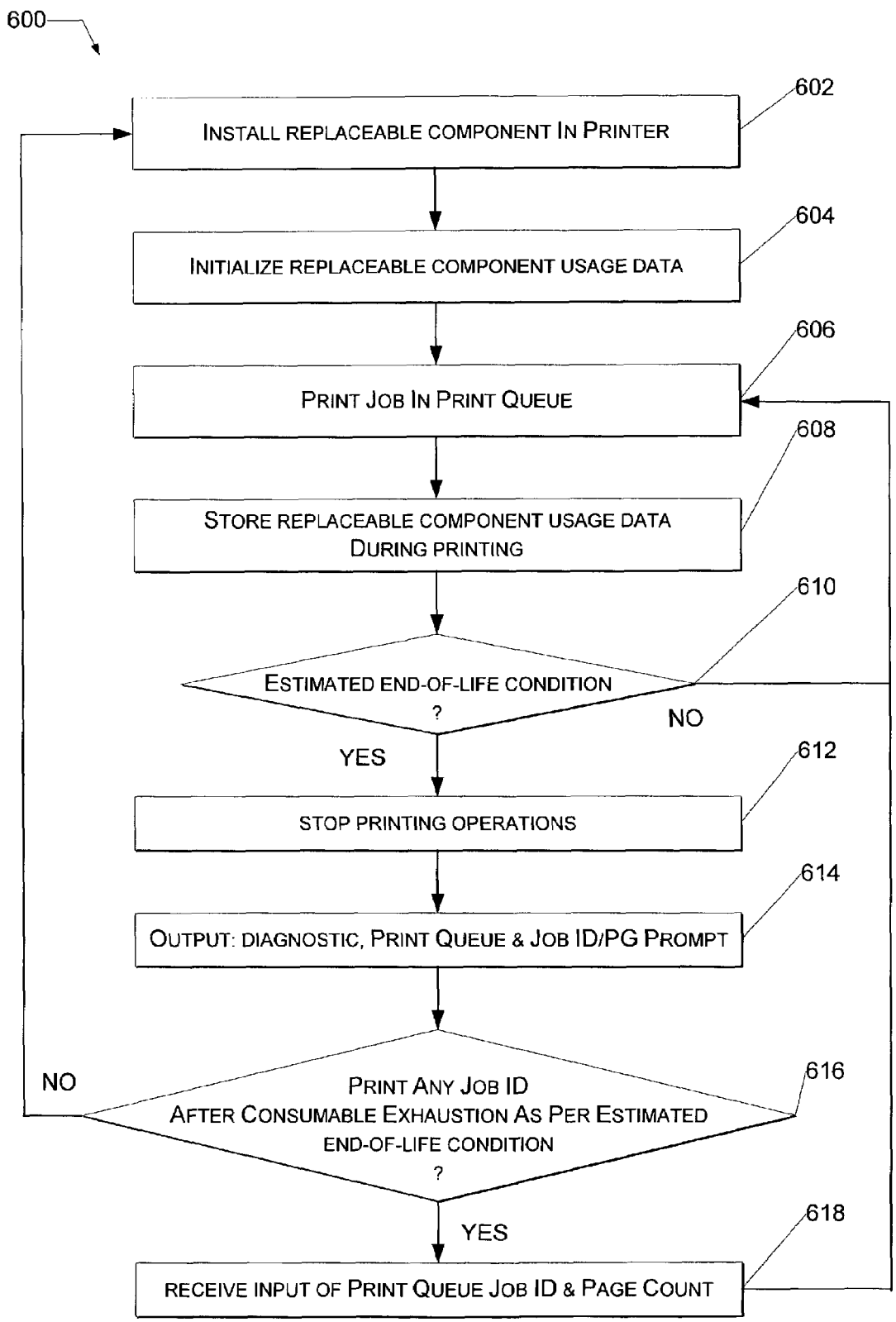
FIG. 6 is a flow diagram of a dynamic messaging process utilizing memory in printer components.

FIG. 6 depicts a process 600 in a flow diagram of a dynamic messaging process for communicating with a user, with particular reference to FIG. 4 for illustrative purposes. At block 602, a user installs a replaceable component in a printer. At block 604 the printer initializes replaceable component usage data with respect to the replaceable component. The replaceable component usage data that is initialized can be replaceable component usage data 50 in memory tag 36 of replaceable component 32B and/or replaceable component usage data 56 in printing device 30B.

At block 606, a print job in the print queue assigned to printing device 30B is printed. At block 608, usage data is accumulated during printing operations of printing device 30B and the usage data is stored in memory associated with one or more of the replaceable components 32B. At block 610, an estimate is taken of one or more of the supplies 64 in each replaceable component 32B in printing device 30B to determine if any of the one or more supplies 64 is at an end-of-life condition. The one or more estimates can be made using one or more of sensor(s) 66 and/or sensor(s) 68. If no end-of-life condition has been estimated, process 600 proceeds to block 606 to continue printing the print job. Otherwise, process 600 moves to block 612 where the printing process is stopped. At block 614, the user is informed by a diagnostic as to the specifics of the estimated end-of-life condition of the particular one or more supplies 64 of the particular one or more replaceable components 32B in printing device 30B. All pending print jobs in the print queue are displayed for viewing by the user. A prompt is also output to instruct the user on how to give input to printing device 30B so as to specific a particular print job ID that the user wants to print as well as a number of pages in the specified print job ID that the user wants to have printed. Example diagnostics and prompts are discussed below in reference to FIGS. 7-9.

At block 616, process 600 determines whether the prompt was responded to with input from the user. If not, then process 600 proceeds to block 602 where the printing device waits until the end-of-life condition identified at block 610 is satisfied. Satisfaction can be made by re-supplying the supply 64 in replaceable component 32B that caused the identified end-of-life condition, or by replacing the replaceable component 32B that caused the identified end-of-life condition. When so satisfied, process 600 moves to block 604 to continue as described above.

At block 616, if process 600 determines that the prompt was responded to with input from the user, process 600 moves to block 618 where the input from the user is verified as corresponding to a print job ID in the print queue and a number of pages therein. The printing of the print job corresponding to the specified print job ID then proceeds at block 606 for a repetition of the indicated portion of process 600 which is described above.

The order in which a method is described with respect to process 600 is not intended to be construed as a limitation, and any number of the described method blocks can be combined in any order to implement the method. Furthermore, the method can be implemented in any suitable hardware, software, firmware, or combination thereof.

When process 600 is operated in an environment where the document processing device is a PC in communication with a printer, several parameters of operation can be implemented within the context of the rendering of the document in the PC and the rendering of the document in the printer. To process an entire print job, the printer may need the ability to interpret a language or format in which the document is stored. For example, if the document data is stored in a raw data format and the printer only understands the Printer Control Language (PCL) language, then the printer cannot process the document until some other device or process converts the raw data into a PCL format. Here, the PC can be this device or perform this process. However, if the document is already stored in a format that is understood by the printer, then the printer can process the document without assistance from an external device. If the printer can process the entire print job, then the document is printed by the printer. If the printer cannot process the entire print job, then the portions of the document (i.e., print job) that it cannot process are delegated to other processing devices.

Figure 7:
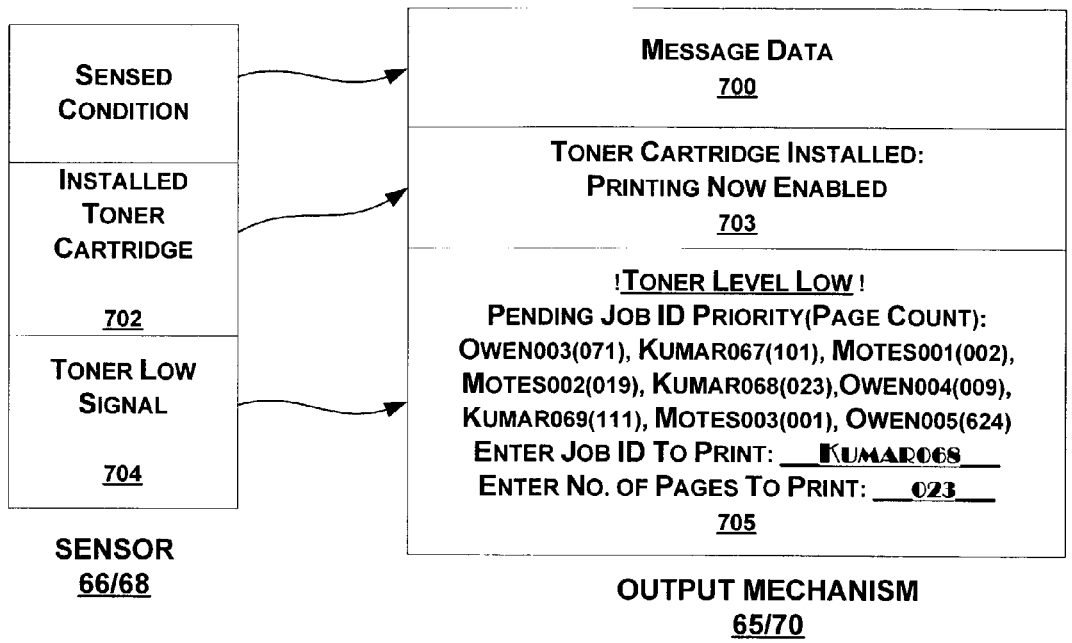
FIG. 7 is a diagram of a messaging process for user communication.
Figure 8:
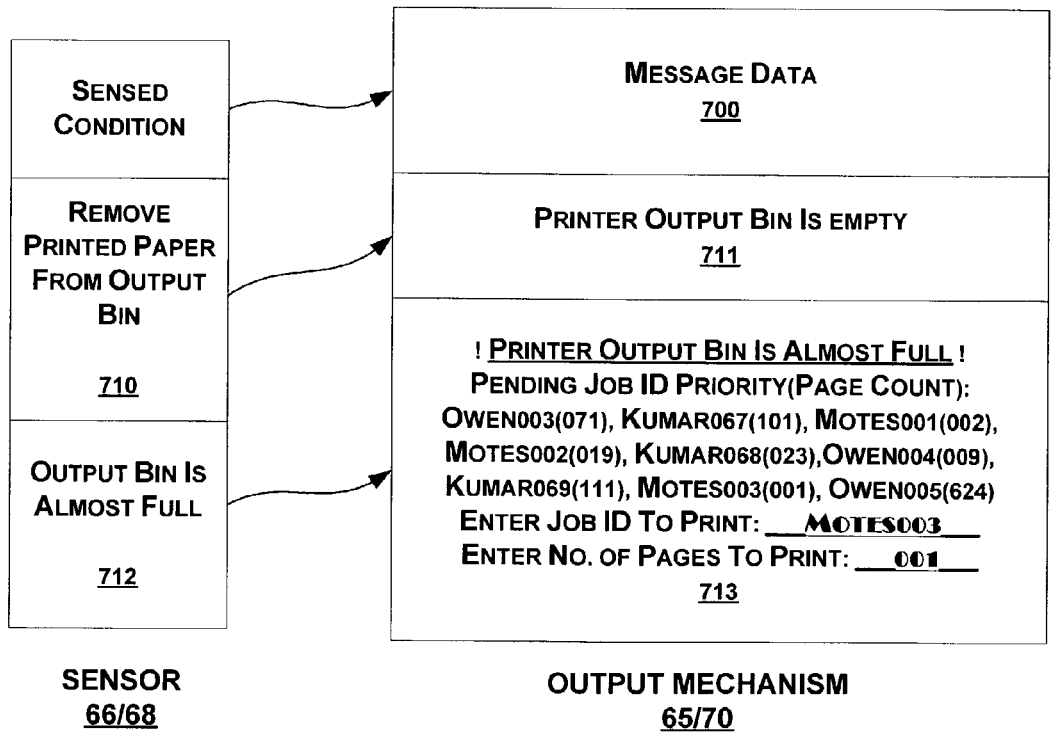
FIG. 8 is a diagram of a messaging process for user communication.

By way of example of the foregoing process 600, particular reference is made to FIGS. 7 and 8. One or more sensor(s) 66 or/and sensor(s) 68 can monitor toner cartridge 32A for an occurrence of sensed conditions. For discussion purposes, a first sensed condition can be when toner cartridge 32A is initially installed in the printer 30A, as seen in FIGS. 2-3.

The printer cartridge 32A is continuously monitored by one or more of the sensor(s) 66 and/or sensor(s) 68 for an occurrence of the first sensed condition, the installation of the toner cartridge 32A seen at reference numeral 702 in FIG. 7. When the toner cartridge 32A installation is detected, one or more of the sensor(s) 66 and/or sensor(s) 68 can be configured to retrieve a first user message 703 that corresponds to the first sensed condition. The message data 700 can be stored in a message lookup table (not shown) contained in the memory 74, memory tag 36, and/or in printer memory 54.

Once one or more of the sensor(s) 66 and/or sensor(s) 68 has retrieved the first user message 703 in response to the first sensed condition 702, the first user message 703 is displayed to the user on output mechanism 65. Alternatively, the first user message 703 may be passed to the computer 67 for display on the graphical user interface 72 of the display monitor 70. Any of output devices 70 or 65 can be of sufficient size to contain a complete electronic representation as shown for the user messages of message data 700, or the display may only be large enough to show one or more lines at a time.

One or more of the sensor(s) 66 and/or sensor(s) 68 can continue to monitor the toner cartridge 32A for an occurrence of a second sensed condition 704, the activation of a toner low signal. When the toner out signal is detected, one or more of the sensor(s) 66 and/or sensor(s) 68 can be configured to retrieve a second user message 705 that corresponds to the second sensed condition 704. Once one or more of the sensor(s) 66 and/or sensor(s) 68 have retrieved the second user message 705 in response to the second sensed condition 704, the second user message 705 can be displayed to the user on the output mechanism 65 of the printer 30A. Alternatively, the second user message 705 may be passed to the computer 67 for display on the graphical user interface 72 of the display monitor 70. Once the second user message 705 is displayed a list is also displayed of the entire print job IDs in a print queue and their corresponding number of pages. A prompt is also displayed that asks the user to input the job ID that the user wishes to have printed as well as the number of pages that the user wishes to have printed. The user can then input these data in response to the prompt. If the printing device was printing the print job that the user wants at the time that the displayed end-of-life condition occurs, the user can input the desired job ID and the full number of pages of the job ID. The printing device will then print only the pages in the job ID that have not yet been printed.

FIG. 8 features sensed conditions 710, 712 for which one or more of the sensor(s) 66 and/or sensor(s) 68 retrieve message data 700 for the output of respective user messages 711, 713 similar to the operations discussed with respect to FIG. 7. Different ways exist for one or more of the sensor(s) 66 and/or sensor(s) 68 to retrieve and coordinate the display of the user messages 703, 705, 711, and 713 from message data 700 stored in memory 74, memory tag 36, or in printer memory 54, such as by the execution of instructions on one or more of logic component 46, printer logic component 62, and/or computer 66. Those of ordinary skill in the relevant arts can use this patent as a guide in implementation of any such way. Similar to the illustration in FIG. 7, FIG. 8 also illustrates the display of the list of all of the print job IDs and corresponding number of pages, as well as the user prompts. The user input in response to the prompts is similar to that illustrated with respect to FIG. 7.

Figure 9:
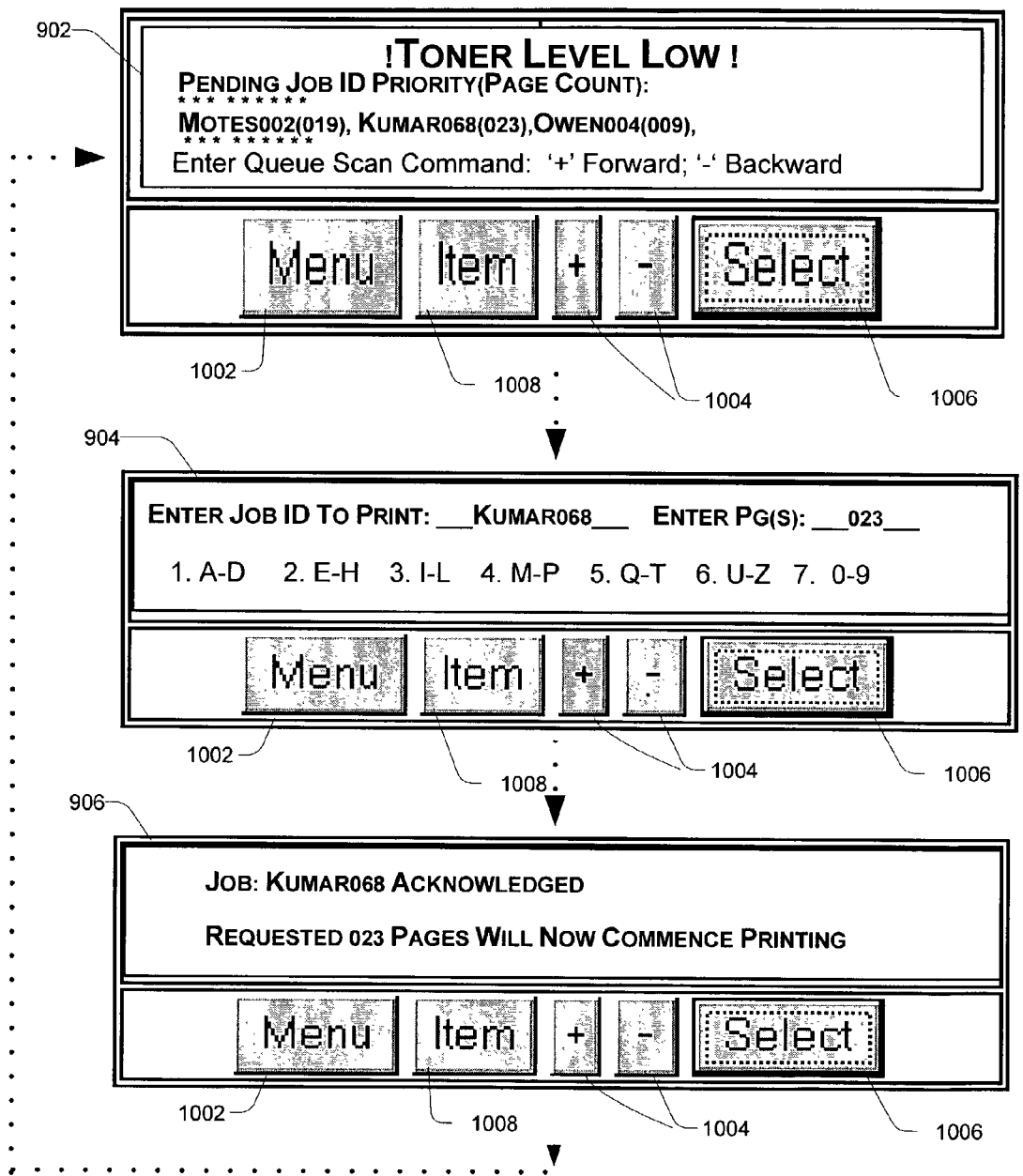
FIG. 9 illustrates an example of menu pages that might be displayed on a touch sensitive menu screen of a printing device and transition sequences among the menu pages, according to an implementation.

As mentioned above, printing device 30B can have a user interface device in the form of input mechanism 60 and output mechanism 65. The user interface can be used to accept the input of a print job ID and a number of pages in the print job ID that the user wished to have the printed. By way of example, a sequence of menus that can be displayed upon a user interface, such as a touch sensitive menu screen that is integral to output mechanism 65 of the printing device 30B. Examples of menus that can be displayed upon such a touch sensitive menu screen of output mechanism 65 are seen in FIG. 9. The menus depicted in FIG. 9 illustrate a 'drill-down' function for accomplishing a task that the user wishes to perform with the printing device.

A menu screen 902 is displayed upon the touch sensitive menu of printing device 30B. Menu screen 402 shows displays a diagnostic that the toner of toner cartridge 32A is nearly exhausted. Additionally, menu screen 902 displays a partial list of the pending print job IDs in the print queue. When the user selects option "+" on menu screen 902 which is a virtual button, the display scrolls forward in the list of the pending print job IDs in the print queue. When the user selects the virtual button "−" on menu screen 902, the display scrolls backward in the list of the pending print job IDs in the print queue. When the user selects the virtual button "SELECT" on menu screen 902, menu screen 904 is displayed.

Menu screen 904 is displayed so that printing device 30A can receive input from the user. The user inputs alphanumeric characters that correspond to a print job ID displayed on menu screen 902 and a number of pages that the user want to print in the specified print job ID. The user makes the input by directly entering each character using virtual buttons displayed upon menu screen 904. Menu screen 904 shows a practical example of a user selecting characters for a print job ID and a number of pages. Menu screen 904 can be presented by script code executing in printer logic component 62 that allows the user to see alphabetic and symbolic characters by depressing virtual buttons 1004 to move forward and backward through a displayed hierarchical list of available alphanumeric characters. Script code executes in printer logic component 62 to enable a user to select a displayed character by depressing virtual button 1006. The user can select a sequence of characters by depressing virtual buttons 1004 to thereby move forward and backward through the sequence of characters. As such, alphanumeric sequences of characters can be selected by the user on menu screen 904. By depressing virtual button 1006, the user can select a particular sequence of characters that is displayed. Menu screen 904 shows that a user has entered the job ID "KUMAR068" and the number of pages as "023". As seen in menu screen 902, the full number of pages in the print job ID "KUMAR068" has been input by the user. After the user presses the virtual button "MENU" on menu screen 904, then menu screen 906 appears. The significance of the characters in the print job ID can be varied so as to be a helpful mnemonic for the user who will select a print job. For example, the alphabetic characters can be all or part of the user's name or initials and the numeric characters can be a sequential number of the print jobs scheduled by the user.

As seen in menu screen 906, the print job ID and requested number of pages has been acknowledged by printing device 30B as has the commencement of the printing thereof. Other virtual buttons displayed on the touch sensitive menu screen are also contemplated in order to provide for the initiation of other or additional functions by the user, such as an item virtual item button 1008 seen in FIG. 9.

Printing device 30B can store the menu documents display as shown in FIG. 9 in printer memory 54. These menu documents can be interpreted by printer logic component 52 and can be configured to display textual and graphical information as menu pages on the touch sensitive menu screen. The menu documents driving the menu pages can include script code that is associated with graphical keys. The term "script code" is intended herein to mean any one of a variety of different code types. Various kinds of code are contemplated. By way of example, the code can be implemented in embedded script code, in firmware, in a native code such as C++ code, or can be JAVA script. The code can be written in JavaScript code that is interpreted and executed on a Java Virtual Machine (JVM). The code can also be written in other script code languages such as VBScript or Perl.

Selecting a menu item by pressing a graphical key on the touch sensitive menu screen triggers an event which causes printer logic component 62 to interpret and execute a software module that includes script code associated with the selected graphical key. The software module can be in printer memory 54 and executed on printer logic component 62 so as to both interpret and execute the script code. The script code can be associated with selectable menu items (i.e., graphical keys or buttons). One menu item is configured to perform the task of receiving input of a print job ID and one or more pages to print in the print job associated with the print job ID. Still another menu item can be configured to perform the task of displaying the print queue and/or indicators about pending print jobs in the print queue, such as the print job data discussed with respect to FIG. 5.

An example of an implementation is seen by reference to FIGS. 2-4, where a toner cartridge 32A is installable in and removable from a laser printer 30A. The toner cartridge 32A includes memory 36 which can be an RFID memory or a direct contact identification memory. The memory 36 is configured to store replaceable component usage data 50 received from an interrogator 52. The replaceable component usage data 50 can be, but is not limited to, a page count received from a page counter in the reader/writer that maintains a page count that is the number of pages printed using the toner cartridge 32A. The memory 36 is also configured to store an end of life status 51 which can be an out-of-toner status and also to store an override status 47. The override status 47 can be received by input from any of the laser printer 30A and/or computer 67. The out-of-toner status is received after an estimate has been made that the toner in the toner cartridge 32A is near exhaustion. The toner cartridge 32A can have one of more of the sensor(s) 66 and/or sensor(s) 68 to monitor the available quantity of toner in the toner cartridge 32A. The interrogator 52 in the laser printer 30A receives the available quantity of toner in the toner cartridge 32A from the one of more of the sensor(s) 66 and/or sensor(s) 68 to estimate that the toner in the toner cartridge 32A is near exhaustion. The override status 47 is received after the out-of-toner status has been received and permits the laser printer 30A to continue the use of any toner in the toner cartridge 32A in laser printing operations. The laser printer 30A will discontinue printing when the out-of-toner status has been received from the interrogator 52 and the override status 47 has not yet been received.

The printed document that is printed by a printing device in various embodiments described herein can have many forms. For instance, the document can be a letter containing text that is being edited by a word processing program, an electronic mail (e-mail) message that is being created by an e-mail program, a drawing that is created by the user by operating a drawing program, a spreadsheet that the user is constructing by operating a spreadsheet program, or a poster that is being designed by a user by operating a desktop publishing program. Other types of documents are also contemplated for use in other embodiments.

In various embodiments described herein, the printing device can be a simple dot matrix printer or a complex printer such as a digital press or a network printer. Complex printers can have capabilities that include high quality photo reproduction, multi-section reports with tabs, in-line mixed material insertion such as insertion of full-color preprinted copies and digital color-page insertion. Other complex printer capabilities include printing on substrates of varied composition, such as embossed, heavy-weight, multi-weight, and cover paper stock, as well as carbonless paper, blue prints, clear or colored transparency printing, and other specialty stock including preprinted offset color covers. Still other complex printer capabilities includes binding, collating, folding, stacking, stapling, stitching such as saddle stitching, edge-trimming, paginating for multi-language, and inline pagination and annotation. Still another printer is a multifunction peripheral (MFP), sometimes referred to as an "All-In-One", which combines two or more peripheral devices into a single device, such as printing, scanning, copying, and facsimile transmission. The printer can be a Graphical Display Interface (GDI) printer or a printer interpreting a page description language.

In other embodiments described herein, the document processing application executes on a logic component of the document processing device to form a bitmap image of a document that is communicated to the printing device through the interconnected network. In still another embodiment, the document processing application is included in a word processing application. In yet another embodiment, the document processing application includes a spooler for spooling print jobs that are to be communicated to the printing device through the interconnected network or through a hardware port on a PC.

Thus, although some of the embodiments described herein of the various methods, printing devices, and toner cartridges have been illustrated in the accompanying Drawings and described in the foregoing Detailed Description, it will be understood that the invention is not limited to the exemplary implementations disclosed, but is capable of numerous rearrangements, modifications and substitutions without departing from the scope of the invention as set forth and defined by the following claims.

What is claimed is:

1. In a printing device having a replaceable component used to print, a method comprising:
   stopping printing in response to an end-of-life condition of the replaceable component;

outputting:
  a diagnostic reflecting the end-of-life condition; and
  a list of identifiers (ID) of one or more pending print jobs;
printing one said pending print job in response to an input of an ID of the one said pending print job, wherein the end-of-life condition of the replaceable component signifies comprising of:
  a potential quality degradation of the printing if the printing is resumed;
  insufficiency of printing supplies in the replaceable component;
  insufficiency of printing media available to be printed on during the printing;
  insufficiency of printing substance available for application to the printing media during the printing;
  insufficiency of toner available for application to the printing media during the printing;
  insufficiency of a laser printer drum;
  insufficiency of laser printer developer;
  insufficiency of a laser printer fuser;
  insufficiency of a printing media transfer belt;
  insufficiency of staples for stapling the printing media during the printing; and
  insufficiency of output volume available for the printing media to be printed on by the printing.

2. In a printing device having a replaceable component used to print, a method comprising:
  stopping printing in response to an end-of life condition of the replaceable component;
  outputting:
    a diagnostic reflecting the end-of-life condition; and
    a list of identifiers (ID) of one or more pending print jobs;
  printing one said pending print job in response to an input of an ID of the one said pending print job,
  the printing device further comprises a sensor for sensing a sensed condition of the replaceable component; and
  the stopping printing in response to an end-of-life condition of the replaceable component further comprises comparing the sensed condition sensed by the sensor to a corresponding predetermined quantity to determine the occurrence of the end-of-life condition of the replaceable component, wherein the sensed condition is comprising of:
    the availability of printing supplies in the replaceable component;
    the availability of printing media available to be printed on during the printing;
    the availability of printing substance available for application to the printing media during the printing;
    the availability of toner in a toner cartridge for application to the printing media during the printing;
    the sufficiency of a laser printer drum for the printing;
    the availability of developer for the printing;
    the sufficiency of a laser printer fuser;
    the sufficiency of a printing media transfer belt;
    the availability of staples for stapling the printing media during the printing; and
    the insufficiency of output volume available for the printing media to be printed on by the printing.

3. In a printing device having an input mechanism, an output mechanism, a memory, and a replaceable component that is utilized during printing operations of the printing device, a method comprising:
  storing replaceable component usage data in the memory during the printing operations after the replaceable component is installed in the printing device;
  estimating from the replaceable component usage data in the memory when the replaceable component is at an end-of-life condition; and
  after the estimating of the end-of-life condition:
    stopping the printing operations;
    outputting to the output mechanism:
      a diagnostic reflecting the end-of-life condition of the replaceable component;
      a list of identifiers (ID) corresponding to one or more pending print jobs; and
      a prompt soliciting an input of the ID corresponding to one said pending print job;
    receiving at the input mechanism the input of the ID corresponding to one said pending print job; and
    printing the pending print job corresponding to the ID received at the input mechanism, wherein the replaceable component is selected from the group consisting of:
      printing media available to be printed on during the printing operations;
      printing substance available for application to printing media during the printing operations;
      toner in a toner cartridge available for application to paper during the printing operations;
      a laser printer drum;
      developer for a laser printer;
      a fuser for a laser printer;
      a transfer belt for a laser printer;
      a roller for a laser printer;
      staples for stapling papers together during the printing operations; and
      available storage for the printing media that has been printed on by the printing.

4. A printer comprising:
  means used for printing that is exhaustable by the printing, wherein the means used for printing that is exhaustible by the printing is a laser printer drum;
  means for estimating the exhaustion of the means used for printing, wherein the estimated exhaustion is insufficiency of the laser printer drum; and
  means for stopping printing a pending print job in response to an estimate by the means for estimating that the means used for printing is exhausted;
  means for outputting:
    a diagnostic reflecting the estimated exhaustion; and
    a list of identifiers (ID) of one or more said pending print jobs;
  means for receiving, in response to the diagnostic, the ID corresponding to one said pending print job.

5. A printer comprising:
  means used for printing that is exhaustable by the printing, wherein the means used for printing that is exhaustible by the printing is a laser printer fuser;
  means for estimating the exhaustion of the means used for printing, wherein the estimated exhaustion is insufficiency of the laser printer fuser; and
  means for stopping printing a pending print job in response to an estimate by the means for estimating that the means used for printing is exhausted;
  means for outputting:
    a diagnostic reflecting the estimated exhaustion; and
    a list of identifiers (ID) of one or more said pending print jobs;
  means for receiving, in response to the diagnostic, the ID corresponding to one said pending print job.

6. A printer comprising:
means used for printing that is exhaustable by the printing, wherein the means used for printing that is exhaustible by the printing is a printing media transfer belt;
means for estimating the exhaustion of the means used for printing, wherein the estimated exhaustion is insufficiency of the printing media transfer belt; and
means for stopping printing a pending print job in response to an estimate by the means for estimating that the means used for printing is exhausted;
means for outputting:
 a diagnostic reflecting the estimated exhaustion; and
 a list of identifiers (ID) of one or more said pending print jobs;
means for receiving, in response to the diagnostic, the ID corresponding to one said pending print job.

7. A printer comprising:
means used for printing that is exhaustable by the printing, wherein the means used for printing that is exhaustible by the printing is available storage for the printing media that has been printed on by the printing;
means for estimating the exhaustion of the means used for printing, wherein the estimated exhaustion is unavailability of the available storage for the printing media that has been printed on by the printing; and
means for stopping printing a pending print job in response to an estimate by the means for estimating that the means used for printing is exhausted;
means for outputting:
 a diagnostic reflecting the estimated exhaustion; and
 a list of identifiers (ID) of one or more said pending print jobs;
means for receiving, in response to the diagnostic, the ID corresponding to one said pending print job.

8. A printer comprising:
means used for printing that is exhaustible by the printing;
means for estimating the exhaustion of the means used for printing;
means for stopping printing a pending print job in response to an estimate by the means for estimating that the means used for printing is exhausted;
means for outputting:
 a diagnostic reflecting the estimated exhaustion; and
 a list of identifiers (ID) of one or more said pending print jobs;
means for receiving, in response to the diagnostic, the ID corresponding to one said pending print job, wherein:
 the means for estimating the exhaustion of the means used for printing further comprises sensing means for sensing a sensed condition of the means used for printing; and
 the means for stopping printing in response to an estimate by the means for estimating that the means used for printing is exhausted further comprises means for comparing the sensed condition sensed by the sensing means to a corresponding predetermined quantity to arrive at a comparison quantity that is used by the means for estimating; and
 wherein the sensed condition is selected from the group comprising of:
  the availability of printing supplies in the means used for printing;
  the availability of printing media available to be printed on during the printing;
  the availability of printing substance available for application to the printing media during the printing;
  the availability of toner for application to the printing media during the printing;
  the sufficiency of a laser printer drum for the printing;
  the availability of developer for the printing;
  the sufficiency of a laser printer fuser;
  the sufficiency of a printing media transfer belt;
  the availability of staples for stapling the printing media during the printing; and
  the unavailability of storage for the printing media that has been printed on by the printing.

9. A printer comprising:
at least one replaceable component installable therein and removable therefrom, the replaceable component having component memory integrated therein;
a storing device configured to store replaceable component usage data in the component memory;
a reader/writer configured to poll the replaceable component usage data and determine an end-of-life condition for the at least one replaceable component when the polled replaceable component usage data is out of variance with at least one predetermined standard corresponding to the at least one replaceable component;
means for stopping printing upon the determination of the end-of-life condition;
means for outputting one or more print job IDs corresponding to a print queue;
means for receiving input of one said print job ID; and
means for printing, in response to receiving the input, a print job in the print queue corresponding to the one said print job ID, wherein:
 the replaceable component usage data is selected from the group consisting of:
  a number of pages available to be printed in a print job in the print queue;
  a page counter configured to count the number of pages printed in a print job in the print queue;
  a quantifier of toner available for application to the pages in a print job in the print queue;
  a quantifier of a laser printer drum available for use in printing the pages in a print job in the print queue;
  a quantifier of laser printer developer available for use in printing the pages in a print job in the print queue;
  a quantifier of a laser printer fuser available for use in printing the pages in a print job in the print queue;
  a quantifier of a printing media transfer belt available for use in printing the pages in a print job in the print queue;
  a quantifier of staples available for stapling the pages in a print job in the print queue;
  a quantifier of storage available for the pages to be printed in a print job in the print queue;
 the reader/writer further comprises:
  a sensor configured to measure the replaceable component usage data; and
  means for determining from the measured replaceable component usage data that the variance with the at least one predetermined standard corresponding to the at least one replaceable component has been exceeded.

* * * * *

UNITED STATES PATENT AND TRADEMARK OFFICE
CERTIFICATE OF CORRECTION

PATENT NO. : 7,230,730 B2  Page 1 of 1
APPLICATION NO. : 10/282894
DATED : June 12, 2007
INVENTOR(S) : Kevin Owen et al.

It is certified that error appears in the above-identified patent and that said Letters Patent is hereby corrected as shown below:

In column 7, line 46, delete "(i+l)" and insert -- (i+1) --, therefor.

In column 15, line 15, in Claim 6, delete "ID)" and insert -- ID --, therefor.

Signed and Sealed this

Twenty-sixth Day of August, 2008

JON W. DUDAS
*Director of the United States Patent and Trademark Office*